United States Patent [19]

Roberts et al.

[11] 4,053,375

[45] Oct. 11, 1977

[54] PROCESS FOR RECOVERY OF ALUMINA-CRYOLITE WASTE IN ALUMINUM PRODUCTION

[75] Inventors: Elliott J. Roberts, Westport; Stanley Bunk, Glenville; Peter Allen Angevine, Ridgefield, all of Conn.

[73] Assignee: Dorr-Oliver Incorporated, Stamford, Conn.

[21] Appl. No.: 706,028

[22] Filed: July 16, 1976

[51] Int. Cl.² ............................................. C25C 3/06
[52] U.S. Cl. .................................... 204/67; 423/111; 23/313 FB; 252/518; 423/465; 423/625
[58] Field of Search ................... 423/111, 659 F, 465; 204/67; 23/313 R, 313 FB

[56] References Cited

U.S. PATENT DOCUMENTS

| | | | |
|---|---|---|---|
| 2,451,492 | 10/1948 | Johnson | 204/67 |
| 2,789,034 | 4/1957 | Swaine et al. | 423/313 FB X |
| 3,053,648 | 9/1962 | Stephens, Jr. et al. | 423/659 F UX |
| 3,392,092 | 7/1968 | Diller | 204/67 |

FOREIGN PATENT DOCUMENTS

| | | | |
|---|---|---|---|
| 286,065 | 6/1965 | Australia | 204/67 |
| 529,971 | 9/1956 | Canada | 423/111 |
| 1,166,471 | 11/1958 | France | 23/313 FB |
| 1,792,752 | 2/1975 | Germany | 23/313 R |
| 1,415,856 | 11/1975 | United Kingdom | 423/465 |

*Primary Examiner*—Edward Stern
*Attorney, Agent, or Firm*—H. M. Snyder; Burtsell J. Kearns; Theodore M. Jablon

[57] ABSTRACT

Alumina-cryolite waste from aluminum pot lines is subjected to oxidation in a fluidized bed reactor to remove carbon and organic contamination. Agglomeration of the alumina-cryolite product occurs in the fluidized bed and a pellet product suitable for return to the aluminum pot lines is produced.

7 Claims, 1 Drawing Figure

U.S. Patent     Oct. 11, 1977     4,053,375
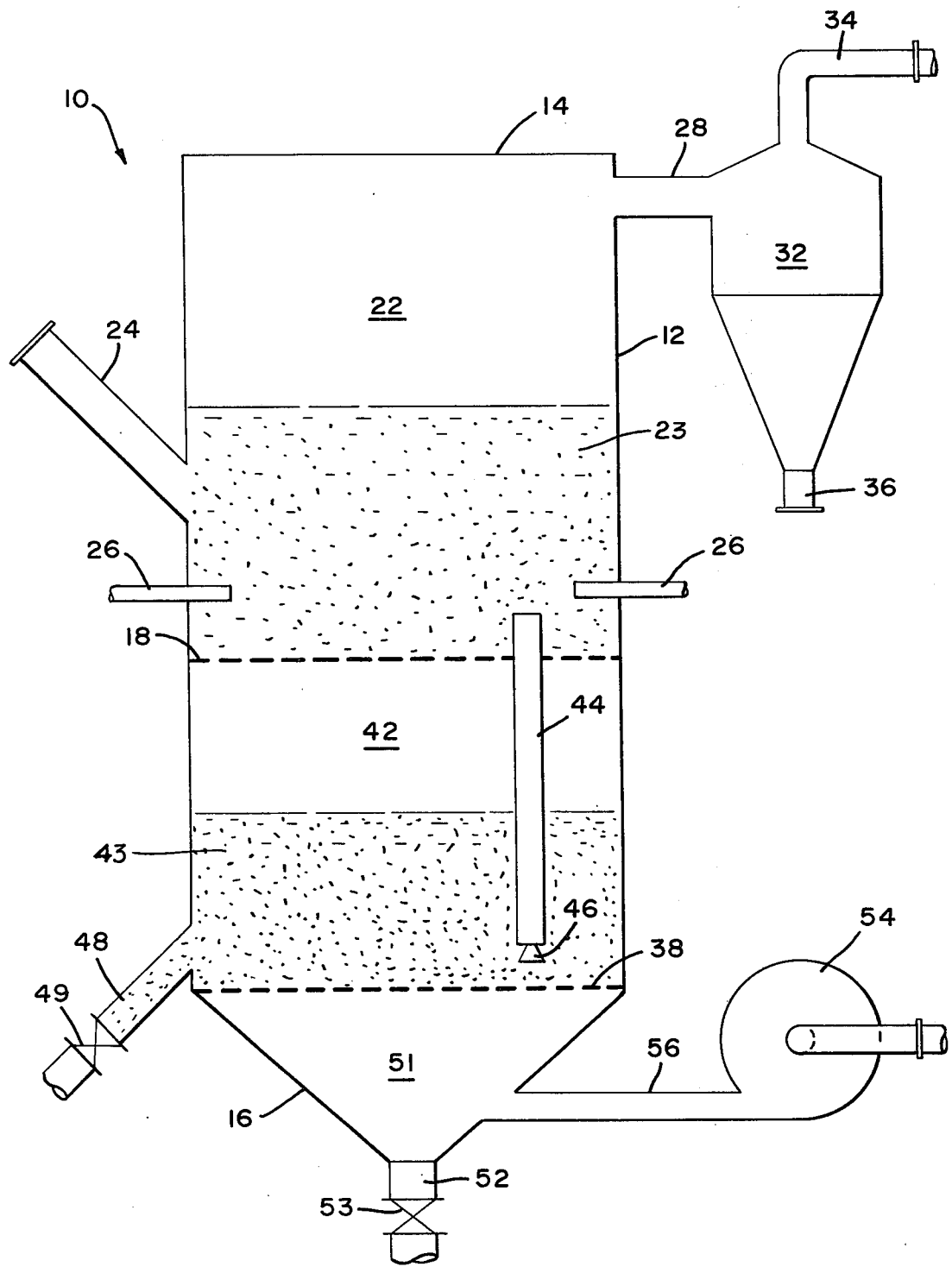

PROCESS FOR RECOVERY OF ALUMINA-CRYOLITE WASTE IN ALUMINUM PRODUCTION

This invention is directed to a process in which certain waste constituents of the aluminum production process are recovered in a fluidized bed reactor and are recycled.

Aluminum is produced by the electrolytic reduction of pure alumina in a bath of fused cryolite ($3NaF.AlF_3$). The reaction is carried out in an electrolytic cell called an aluminum reduction pot in which the alumina is dissolved in a molten cryolite bath. The solution of alumina in molten cryolite is electrolyzed to form metallic aluminum. The aluminum produced in the reaction is heavier than the electrolyte and so forms a molten layer at the bottom of the reduction pot which serves as the cathode of the cell. Carbon anodes extend into the bath and oxygen liberated at the anode oxidizes carbon from the electrode.

Control of the electrolyte composition is an important consideration in the aluminum production process. The electrolyte contains cryolite and fluorospar (calcium fluoride, $CaF_2$). Some excess aluminum fluoride is also present in the electrolyte which, with the dissolved alumina, reduces the liquidus temperature to the point where the cells can be operated in the 940° to 980° C range.

A large volume of gas, with gas-entrained dust, is emitted by the batteries of reduction pots used in the production of aluminum. The gases emitted include carbon dioxide, volatilized fluorides and gaseous HF. Particulate solids, including fine alumina, cryolite, carbon and organics, are elutriated from the electrolytic bath with the gases. Small amounts of lithium, calcium, silica, iron, sodium sulfate and magnesium are solids also present in the gas stream.

The volatilized fluorides and the gaseous hydrogen fluoride are collected, together with other gases and entrained solids evolved from the cells, by gas-collecting hoods or manifolds and are passed through large ducts to central gas treatment and recovery facilities. The loss of these materials from the electrolyte necessitates periodic additions of aluminum fluoride to maintain the desired bath composition. In some cases the gaseous products with entrained particulates have simply been discharged into the atmosphere, the recovery of the particulates being judged too difficult because of their fine particle size (less than 2 microns) and contamination. However, at the present time, simple discharge of the waste fumes from aluminum reduction pot lines into the atmosphere is no longer feasible in view of environmental considerations. Accordingly, rather elaborate and expensive gas treatment equipment including a wet scrubbing system has been provided or is contemplated at many facilities. The wet scrubbing is quite efficient in removing solid particulates from the gas stream and, accordingly, a substantial quantity of very fine, potentially valuable, but contaminated solids are available and must be disposed of or utilized in some fashion.

There is a real need, in the production of aluminum, for a process which will permit recycling of solids elutriated from the aluminum pot lines.

It is the object of this invention to provide a process for treating solid particulates elutriated from an aluminum pot line wherein contaminating carbon and organics are removed and the valuable fine solids are agglomerated to provide a particle size convenient for handling.

Other objects and advantages will become apparent to those skilled in the art from the following description, taken in conjunction with the drawing in which;

The FIGURE is a schematic view of a fluid bed reactor suitable for carrying out the process of the invention.

Generally speaking, the present invention involves treatment of a slurry containing solid particulates separated from the off-gases of aluminum pot lines, in a fluidized bed reactor in which the carbon and organic contaminants are subjected to combustion at a temperature sufficiently high to provide a liquid phase in the solids to promote pelletization. More specifically, a slurry comprising the solid particulates is introduced into a fluidized bed reactor operating at a temperature in the range from 770° to 800° C and preferably at a temperature of 790° ± 5° C. The waste particulates include the constituents: cryolite, carbon and organics, $Al_2O_3$; $Na_2SO_4$, $CaF_2$, $Na_2CO_3$ and small amounts of other substances. The pellet product produced has the composition: cryolite, $Al_2O_3$, NaF, $Na_2SO_4$, $CaF_2$, $Fe_2O_3$ and small amounts of other substances.

Temperatures in excess of 820° C will cause defluidization of the fluidized bed due to the high relative amount of liquid phase, particularly in view of the fact that the particulates contain sodium sulfate which forms low melting eutectic mixtures with other constituents. When slurry is fed to the fluidized bed reactor the moisture is quickly evaporated. Since this requires a substantial amount of heat, it may be necessary to provide auxiliary fuel where the amount of carbon and organics is not sufficient to sustain the reaction.

It is also feasible to dry the slurry to powder form, perhaps using the excess heat from the fluidized bed reactor, blow the powder charge into the reactor and introduce quench water into the reactor to maintain the reaction temperature in the desired range.

Referring to the figure, the reactor 10 comprises an outer shell 12 which is capped by a cover 14. The conical portion 16 forms the bottom of the reactor 10 and is provided with a cleanout port 52. Within shell 12 the reactor 10 is provided with an upper constriction plate 18 and a lower constriction plate 38. Constriction plate 18 divides the interior of reactor 10 into a treatment chamber 22 located in the upper portion thereof and a cooling chamber 42 located in the lower portion of the reactor. Constriction plate 38 separates the cooling chamber 42 from the windbox 51 which is located between the constriction plate 38 and the conical portion 16. The constriction plate 18 supports a fluidized bed 23 composed of particulate solids. A feed pipe 24 provides access to the treatment chamber 22 and a plurality of fuel guns 26 penetrate the shell 12 above the constriction plate 18. An exhaust gas conduit 28 is provided near the top of treatment chamber 22 and is connected to a cyclone 32 having an off-gas conduit 34 and a solids underflow conduit 36.

Constriction plate 38 supports a fluidized bed 43 in the cooling chamber 42. A transfer conduit 44 having a control valve 46 therein communicates between fluidized bed 23 and treatment chamber 22 and fluidized bed 43 and cooling chamber 42. A product conduit 48 communicates with fluidized bed 43 and has a control valve 49 therein. A blower 54 communicates with windbox 51 through air conduit 56.

In operation, fluidized beds are established in both the treatment chamber 22 and the cooling chamber 42, both sustained in a fluidized condition by air supplied by blower 54 through conduit 56. A feed of waste particulate solids separated from the off-gases of an aluminum pot line is supplied in a moist or wet state through the feed pipe 24 into treatment chamber 22. In this chamber the moisture in the charge is rapidly evaporated and the solids are heated to the treatment temperature in the violently agitated environment provided by the fluidized bed 23. The fluidized bed 23 is maintained at a temperature in the range from 770° to 800° C or preferably, at a temperature of 790° ± 5° C. While this temperature can often be achieved simply by combustion of the carbon and organics present as impurities in the charge, it may sometimes be necessary to introduce auxiliary fuel into the fluidized bed 23 through the fuel guns 26. The oxygen for this combustion is supplied by the fluidizing air. The off-gases of the reactor comprise HF, $CO_2$ and water vapor and may be fed into the pot line gas collection system.

At the specified temperature it is found that at least a small amount of a liquid phase is present in the bed constituents and there is a strong tendency for the extremely fine solid particles to agglomerate or pelletize. The pellets from the bed 23 move down the transfer conduit 44, into the cooling bed 43. In the cooling chamber 42 the pellets which form the fluidized bed 43 are cooled to the temperature range from 200° F (93° C) to 250° F (121° C) and may be continuously removed from the reactor 10 through the product outlet 48 which is controlled by valve 49. It should be understood that the fluidizing air provided by blower 54 not only cools the product pellets in traversing the cooling chamber 42, but is itself preheated to a temperature in the range from 93° C to 121° C so that it is a preheated fluidizing gas which passes through constriction plate 18 to fluidize the particulate bed in treatment chamber 22. The fluidized cooling bed is convenient but not essential to the process. Other types of cooling procedures can be utilized satisfactorily in the process.

For the purpose of illustrating the advantages of the invention to those skilled in the art, the following Example is given:

EXAMPLE

A feed of solids elutriated from an aluminum pot line has the following composition (dry weight):

| Constituent | Wt.% |
| --- | --- |
| Cryolite | 49.2 |
| Carbon, organics | 26.4 |
| $Al_2O_3$ | 12 |
| $Na_2SO_4$ | 5.5 |
| $CaF_2$ | 1.8 |
| $AlF_3$ | 1.5 |
| $Na_2CO_3$ | 1 |
| $Fe_2O_3$ | .7 |
| LiF | .4 |
| $SiO_2$ | .3 |
| $P_2O_5$ | .04 |
| NiO | .2 |
| MgO | .2 |
| Miscellaneous | Balance (less than 1%) |

This feed is introduced into a fluidized bed reactor operating at a temperature of 790°±5° C. The starting bed is composed of alumina particles. The product withdrawn from the bed has an average particle size such that at least 90% of the particles produced are retained on a 65 mesh (Tyler mesh) screen; i.e., a particle size of 0.016 inches or greater. The product composition (dry weight) is as follows:

| Constituent | Wt.% |
| --- | --- |
| Cryolite | 50.4 |
| $Al_2O_3$ | 30.4 |
| NaF | 7.5 |
| $Na_2SO_4$ | 6.6 |
| $CaF_2$ | 1.9 |
| $Fe_2O_3$ | 1 |
| LiF | .5 |
| $SiO_2$ | .4 |
| $Na_2CO_3$ | .2 |
| MgO | .2 |
| Miscellaneous | Balance (less than 1%) |

The product is in the form of very regular spherical pellets readily handled for feeding to the aluminum pot lines. The product composition is such that it is highly suitable for pot line feed and is valued at about $100 a ton.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for recovering alumina-cryolite waste generated in aluminum pot lines comprising, charging the alumina-cryolite waste containing carbon and organic contaminants into a reaction bed of particulate solids maintained in the fluidized state by an upflowing stream of oxidizing gas, maintaining the temperature of said bed in the range from about 770° to 800° C to promote a combustin reaction and produce at least a small amount of a liquid phase in said bed to promote agglomeration, retaining the alumina-cryolite waste in the fluidized bed until the combustion reaction consumes the carbon and organic contaminants, the alumina-cryolite product agglomerating at temperature in the fluidized bed to pellet form, discharging the product pellets from the fluidized bed and cooling the discharged pellets.

2. Process of claim 1 wherein the temperature of the fluidized bed is about 790° ± 5° C.

3. Process of claim 1 wherein the discharged pellets are cooled in a fluidized bed.

4. The process of claim 1 wherein the alumina-cryolite waste is charged into the fluidized bed in the form of a water slurry.

5. The process of claim 4 wherein auxiliary fuel is supplied to the fluidized bed to aid in the evaporation of water and maintenance of the operating temperature in the fluidized bed.

6. The process of claim 5 wherein the temperature of the fluidized bed is maintained at about 790° ± 5° C.

7. The process of claim 5 wherein the discharged pellets are cooled in a bed fluidized by an upflowing stream of air, the air preheated in this manner then being passed through the reaction bed as the fluidizing oxidizing gas therefor.

* * * * *